United States Patent
Ko et al.

(10) Patent No.: US 11,502,462 B1
(45) Date of Patent: Nov. 15, 2022

(54) EXTENSION CORD FOR POLYPHASE VOLTAGE CONVERSION

(71) Applicant: Po-Cheng Ko, Taichung (TW)

(72) Inventors: Po-Cheng Ko, Taichung (TW); Chun-Yao Ko, Taichung (TW); Chih-Ting Ko, Taichung (TW)

(73) Assignee: Po-Cheng Ko, Taichung (TW)

( * ) Notice: Subject to any disclaimer, the term of this patent is extended or adjusted under 35 U.S.C. 154(b) by 0 days.

(21) Appl. No.: 17/460,001

(22) Filed: Aug. 27, 2021

(30) Foreign Application Priority Data

Jun. 22, 2021 (TW) ................................ 110122798

(51) Int. Cl.
| | |
|---|---|
| *H01R 13/447* | (2006.01) |
| *H01R 25/00* | (2006.01) |
| *H01R 13/639* | (2006.01) |
| *H01R 13/52* | (2006.01) |
| *H02M 1/00* | (2006.01) |

(52) U.S. Cl.
CPC ....... *H01R 25/003* (2013.01); *H01R 13/5213* (2013.01); *H01R 13/6392* (2013.01); *H02M 1/0083* (2021.05); *H01R 13/447* (2013.01)

(58) Field of Classification Search
CPC .............. H01R 25/003; H01R 13/5213; H01R 13/6392; H01R 13/447; H01R 31/06; H01R 13/518; H01R 13/665; H02M 1/0083
See application file for complete search history.

(56) References Cited

U.S. PATENT DOCUMENTS

| | | | |
|---|---|---|---|
| 6,628,009 B1 * | 9/2003 | Chapel ...................... | H02J 3/26 307/14 |
| 7,414,329 B2 * | 8/2008 | Cleveland ................. | H02J 3/00 324/114 |
| 2020/0287336 A1 * | 9/2020 | Irons ..................... | H01R 25/006 |
| 2021/0298194 A1 * | 9/2021 | Zen-Ruffinen ....... | H05K 7/1492 |

* cited by examiner

*Primary Examiner* — Tho D Ta
(74) *Attorney, Agent, or Firm* — Cheng-Ju Chiang

(57) ABSTRACT

An extension cord for polyphase voltage conversion includes a socket body, a conductive cable and a polyphase circuit disposed in the socket body. The socket body has a hollow housing, and a four-phase power connective head is disposed at an end of the housing in order to supply power to the extension cord. A breaker having safety switch function and at least two power sockets providing voltages with different phases are disposed in the housing. An end of the conductive cable is electrically connectable with a four-phase power source. The other end of the conductive cable has a four-phase power plug electrically connectable with the four-phase power connective head of the socket body. The polyphase circuit includes three phase conductors, a neutral conductor and a ground conductor. The conductors are used to electrically connect with the four-phase power connective head, the breaker and the respective at least two power sockets.

13 Claims, 7 Drawing Sheets

EXTENSION CORD FOR POLYPHASE VOLTAGE CONVERSION

BACKGROUND OF THE INVENTION

1. Field of the Invention

The present invention relates to a technical field of extension cords, particularly relates to an extension cord for polyphase voltage conversion having multiple power using choices. The extension cord in accordance with the present invention has advantages that simple wiring arrangement in construction sites and exhibition sites can be easily deployed, that multiple power using choices are conveniently provided and that power using safety can be further enhanced.

2. The Related Arts

In large temporary places, such as ordinary construction sites, working spaces or exhibition venues, etc., a power box is usually installed at a fixed location in consideration of convenience of power usage since a cabling layout of power usage in these places is not yet completed and electrical equipment used in these places is various and changeable. The power box is equipped with sockets respectively meeting different power using requirements, such as a three-phase voltage of 220 V, a single-phase voltage of 220 V, or a single-phase voltage of 110 V, by using phase wiring for plugging and usage of electrical equipment of different voltages. Restricted by facts that power supply locations are limited and are too distant, extension cords are often required to be used when these large temporary places are in use of power to enhance convenience of power using for various electrical equipment.

However, existing extension cords are usually designed for use of a single voltage. In other words, when a power source with a specified voltage is plugged, its output is correspondingly a power supply of the specified voltage. Nevertheless, as mentioned above, different kinds of electrical equipment are designed to use different usage voltages based on different applying requirements of electrical equipment and consideration of power usage safety. As a result, workers often simultaneously use electrical equipment with different voltages when they work in the aforementioned places. Therefore, the workers are required to arrange a variety of extension cords with different voltages on site in order to meet their requirements for power usage. However, by doing so, these places become messy due to on-site repeated use of extension cords, and on-site workers may stumble carelessly on these extension cords. Besides, accidental situations like electrical equipment being plugged to extension cords with incorrect voltages by the workers are very likely to happen and to seriously affect power usage safety for everyone in these places. Therefore, the aforementioned situations of power usage in the large temporary places are required to be urgently improved, and how to solve the above mentioned problems and deficiencies is a subject that personnel in the relevant industry urgently desires to research and develop.

In view of the above, in order to solve the above problem, the inventors of the present invention uphold many years of rich experience in design, development and actual production in the related industry to research and improve the existing structures and deficiencies. After continuous hard working and effort of research and trial production, an extension cord for polyphase voltage conversion in accordance with the present invention is finally successfully developed to overcome trouble and inconvenience caused by requirements of repeatedly laying extension cords due to being in need of using different voltages.

SUMMARY OF THE INVENTION

Hence, a main objective of the present invention is to provide an extension cord for polyphase voltage conversion which has advantages that the extension cord can be deployed extensively by using a single extension cord, and that sockets having multiple different phases and voltages are provided for enhancement to convenience of power using.

In addition, another main objective of the present invention is to provide an extension cord for polyphase voltage conversion which has an advantage that a cable number of unnecessary extension cords can be reduced for convenience of wiring arrangement, for ensuring safety in working environment and for enhancing practicality of the extension cord.

Based on the above, the previously mentioned objectives and effects of the present invention are mainly achieved through the following technical solution.

The extension cord for polyphase voltage conversion in accordance with the present invention includes a socket body. The socket body has a hollow housing, and a four-phase power connective head is disposed at an end of the housing in order to supply power to the extension cord. A breaker having safety switch function and at least two power sockets providing voltages with different phases are disposed in the housing.

The extension cord further includes a conductive cable. An end of the conductive cable is electrically connectable with a four-phase power source. The other end of the conductive cable has a four-phase power plug correspondingly electrically connectable with the four-phase power connective head of the socket body.

The extension cord further includes a polyphase circuit. The polyphase circuit is disposed in the socket body. The polyphase circuit includes three phase conductors respectively electrically connected with the four-phase power connective head, a neutral conductor and a ground conductor. The conductors are used to electrically connect with the four-phase power connective head, the breaker and the respective at least two power sockets.

Accordingly, through physical practice of the above technical solutions, the extension cord for polyphase voltage conversion in accordance with the present invention is designed to utilize a conversion design of the polyphase circuit disposed in the socket body so that a four-phase power source can constitute a plurality of power sockets with different phases and different voltages through a single breaker for choice of users based on actual need. As a result, only arrangement of a single extension cord is required to provide choice of power sources with multiple phases and voltages. Not only a number of temporarily arranged cables in a working site can be simplified in order to enhance convenience and safety of operation in a working environment, but also entire safety of power using is enhanced and practicality of the extension cord is greatly promoted. Hence, added value of related products is therefore increased, and economic advantage thereof is promoted.

The above objectives and effects of the present invention are further achieved through the following technical solution.

The at least two power sockets of the socket body include a combination including either two or more than two of at least one power socket with a three-phase voltage of 220 V, at least one power socket with a single-phase voltage of 220 V, and at least one power socket with a single-phase voltage of 110 V.

The at least two power sockets of the socket body include a power socket with a three-phase voltage of 220 V, a power socket with a single-phase voltage of 220 V, and three power sockets with a single-phase voltage of 110 V. The phase conductors and the neutral conductor of the polyphase circuit are electrically connected with the breaker. The power socket with a three-phase voltage of 220 V is electrically connected with the phase conductors. The power socket with a single-phase voltage of 220 V is electrically connected with either two of the phase conductors and the ground conductor. The three power sockets with a single-phase voltage of 110 V are not only respectively electrically connected with both of the ground conductor and the neutral conductor, but also are respectively electrically connected with a selective one of the phase conductors in order to balance output electrical currents of output voltages of respective phases.

The housing of the socket body has two opposite work piece interfaces. A work piece interface at a side of the housing has a breaker, a power socket with a three-phase voltage of 220 V and three power sockets with a single-phase voltage of 110 V via cooperative arrangement of the polyphase circuit. The other opposite work piece interface at an opposite side of the housing has a power socket with a single-phase voltage of 220 V and three power sockets with a single-phase voltage of 110 V.

Each of the breaker and the respective at least two power sockets of the socket body has a selectively coverable top cover for dustproof, waterproof protective function.

The top covers of the respective at least two power sockets of the socket body have different colors for recognition of users to a corresponding phase and voltage of each of the at least two power sockets.

The conductive cable has a four-phase power plug corresponding to the four-phase power connective head of the socket body for selective rapid connection between the conductive cable and the socket body.

The four-phase power plug of the conductive cable has a selectively coverable end cover in order to provide dustproof, waterproof protective function.

A four-phase power connective head is disposed at each of two ends of the housing of the socket body. The two four-phase power connective heads can be a male-female mating structure for electrical serial connection via a corresponding conductive cable. Four-phase power plugs corresponding to the male and female four-phase power connective heads of the socket body are respectively disposed at two ends of the corresponding conductive cable in order to increase a using distance of the extension cord.

A support frame is disposed at a bottom face of the housing of the socket body other than faces of the housing having the at least two power sockets for the socket body being straightly disposed on the ground.

In order to enable the honorable Examiner to further understand constitutions, features and other objectives of the present invention, the following is exemplified to show several preferred embodiments of the present invention, and detailed descriptions thereof are provided hereinafter in cooperation with the drawings. At the same time, those who are familiar with the same technical field can physically practice the present invention accordingly.

DETAILED DESCRIPTION OF PREFERRED EMBODIMENT

Figure 1:
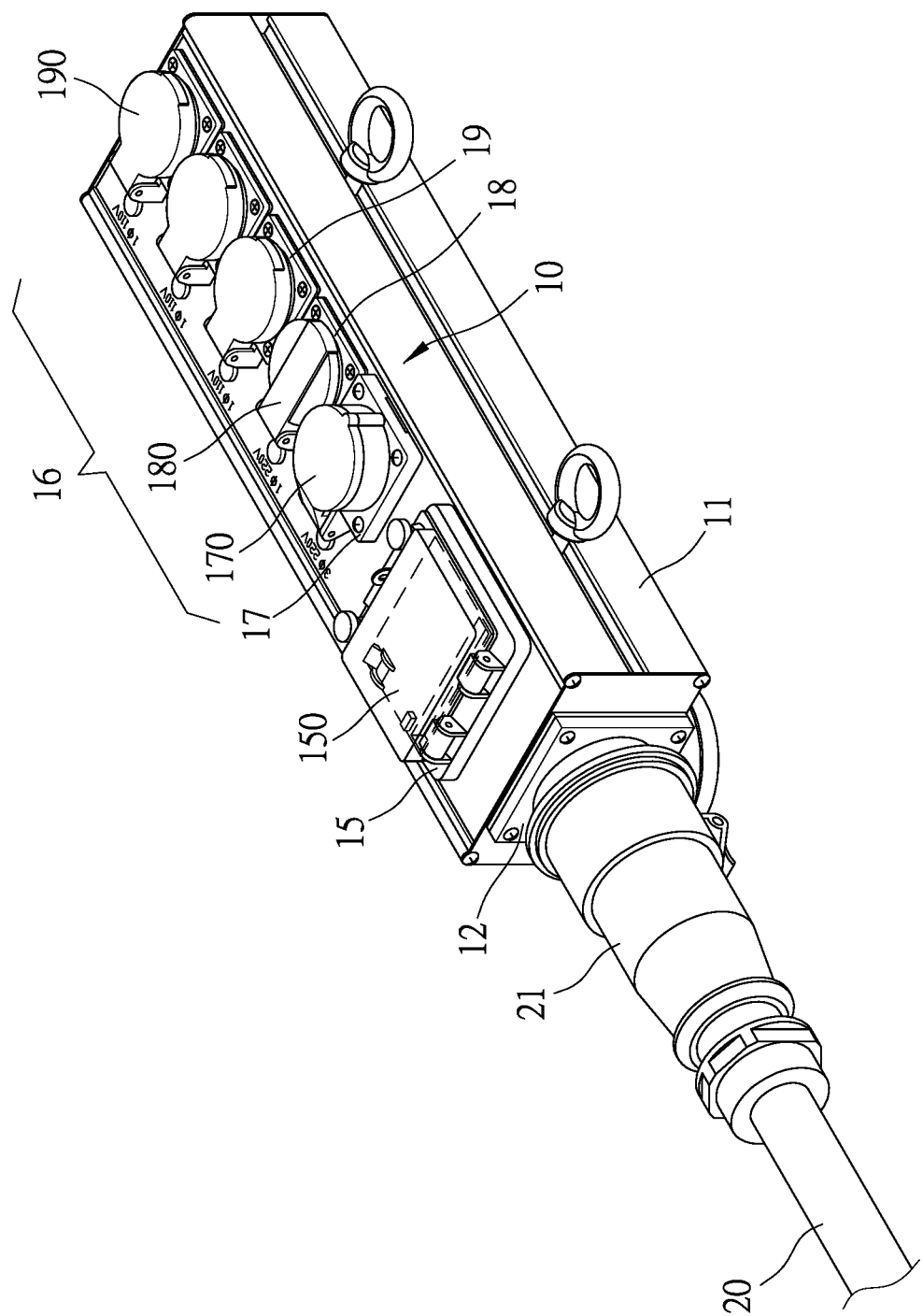
FIG. 1 shows a schematic appearance perspective view of an extension cord for polyphase voltage conversion in accordance with a preferred embodiment of the present invention.

The present invention is related to an extension cord for polyphase voltage conversion. In physical embodiments and components therein in accordance with the present invention illustrated in accompanying drawings, all references regarding front and back, left and right, a top portion and a bottom portion, an upper portion and a lower portion and a horizontal direction and a vertical direction are only used for convenient illustrations, and are not used to limit the present invention or limit components of the present invention in any position or spatial direction. Designated sizes in the drawings and the specification can be varied according to designs and requirements of the present invention without departing from the claimed scope of the present invention.

Figure 2:
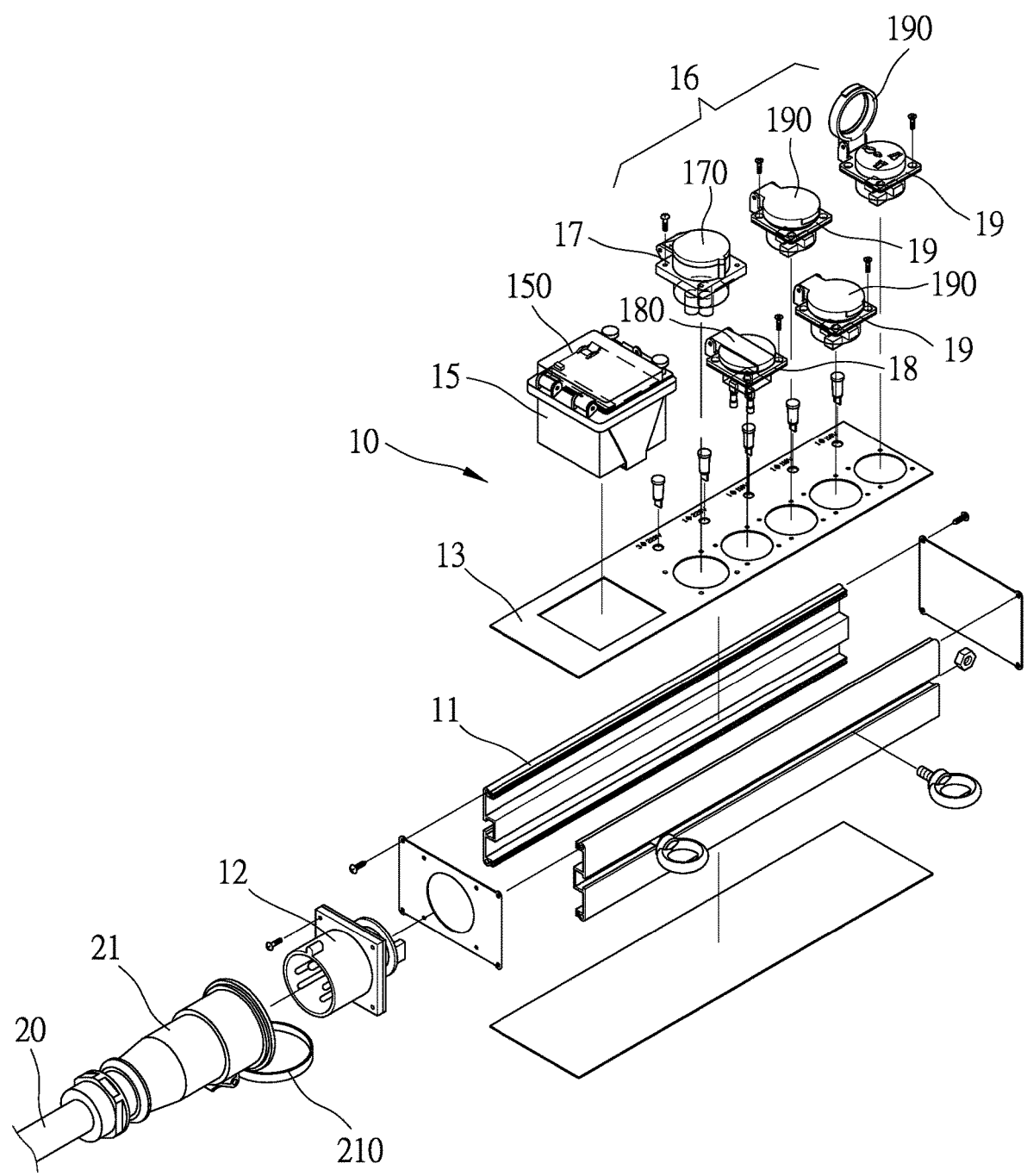
FIG. 2 shows a schematic partially sectional perspective view of the extension cord for polyphase voltage conversion of FIG. 1 in accordance with a preferred embodiment of the present invention for illustration of patterns and relative relationships between respective parts.
Figure 5:
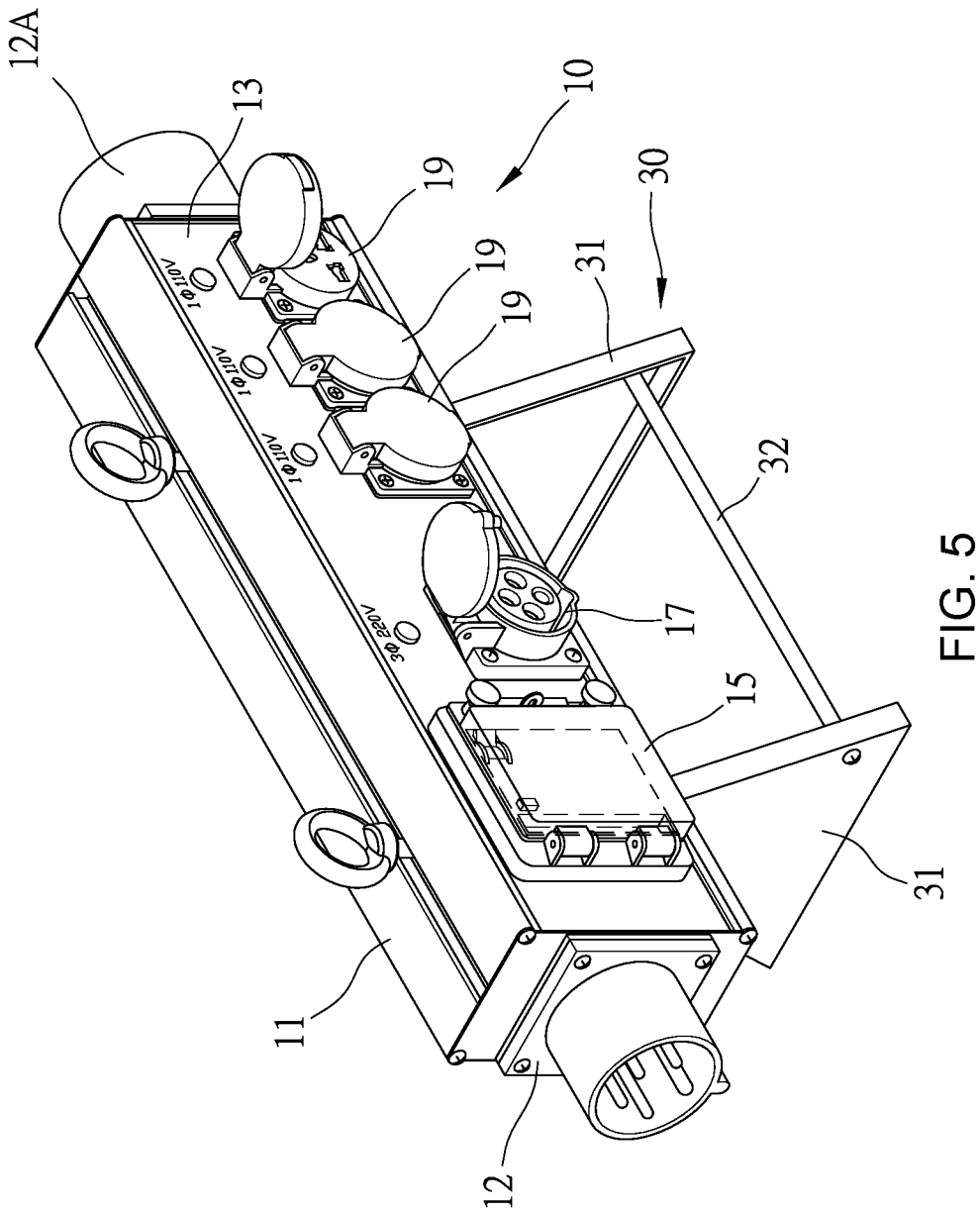
FIG. 5 shows a schematic appearance perspective view of an extension cord for polyphase voltage conversion in accordance with another preferred embodiment of the present invention.

Referring to FIGS. 1-2 and 5, a constitution of an extension cord for polyphase voltage conversion in accordance with a preferred embodiment of the present invention is shown. The extension cord includes a socket body 10, conductive cable 20 and a polyphase circuit 50 disposed in the socket body 10. The extension cord is used to provide power sources with a plurality of voltages, such as a three-phase voltage of 220 V, a single-phase voltage of 220 V or a single-phase voltage of 110 V, etc.

Figure 3:
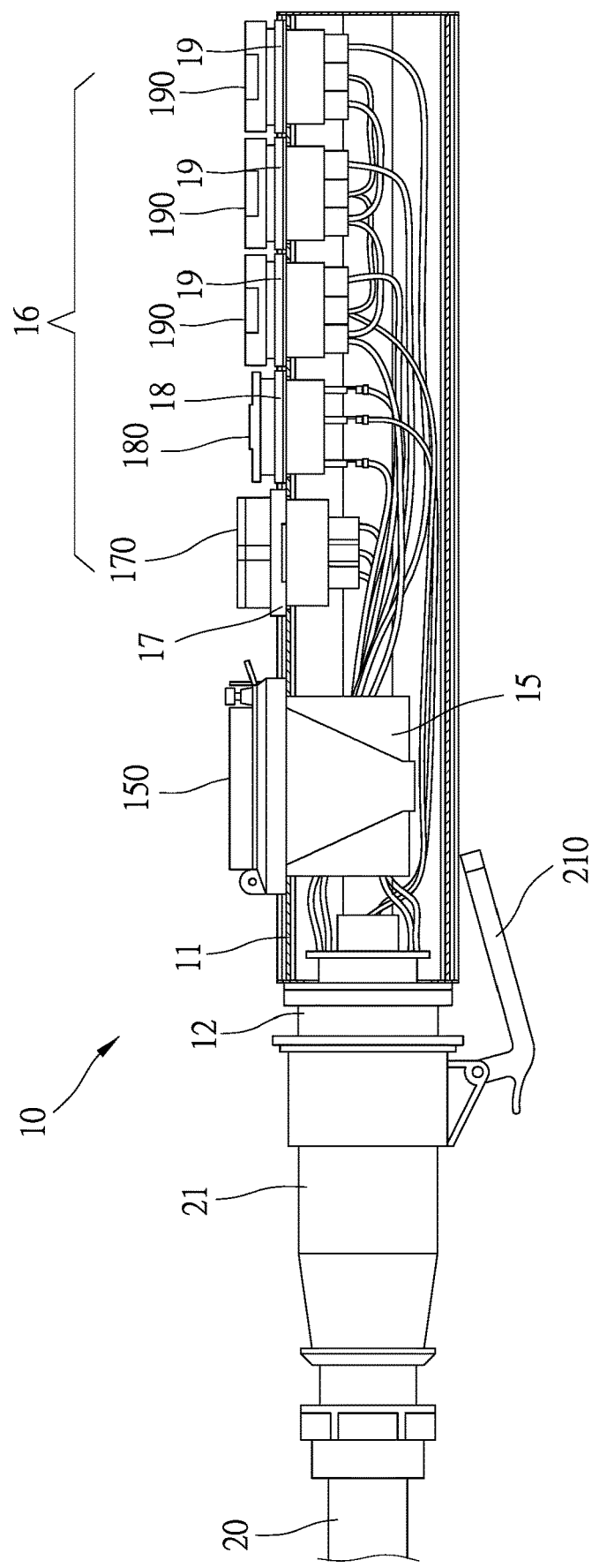
FIG. 3 shows a schematic lateral sectional view of the extension cord for polyphase voltage conversion of FIG. 1 in accordance with a preferred embodiment of the present invention for illustration of constitutive statuses and relative relationships thereof.

Referring to FIGS. 1-3, a detailed constitution of the extension cord for polyphase voltage conversion in accordance with a preferred embodiment of the present invention is shown. The socket body 10 has a hollow housing 11, and a four-phase power connective head 12 is disposed at an end of the housing 11 in order to supply power to the extension cord. In addition, a work piece interface 13 is disposed on a top face of the socket body 10. A breaker 15 having safety switch function and at least two power sockets 16 providing voltages with different phases are disposed on the work piece interface 13. The at least two power sockets 16 include a combination including either two or more than two of at least one power socket 17 with a three-phase voltage of 220 V, at least one power socket 18 with a single-phase voltage of 220 V, and at least one power socket 19 with a single-phase voltage of 110 V. In a main preferred embodiment, the at least two power sockets 16 of the socket body 10 in accordance with the present invention include a power socket 17 with a three-phase voltage of 220 V, a power socket 18 with a single-phase voltage of 220 V, and three power sockets 19 with a single-phase voltage of 110 V. The breaker 15, the power socket 17 with a three-phase voltage of 220 V, the power socket 18 with a single-phase voltage of 220 V and the power sockets 19 with a single-phase voltage of 110 V respectively include a selectively coverable top cover 150, 170, 180, 190 in order to provide dustproof, waterproof protective covering function thereon in case of being not in use, and in order for enhancing power using safety. Word patterns or colors can be printed on surfaces of the top covers 150, 170, 180, 190 in order to provide recognition of users to a corresponding phase and voltage of each of the at least two power sockets 16.

An end of the conductive cable 20 has a four-phase power plug 21 correspondingly connectable with the four-phase power connective head 12 of the socket body 10. As a result, the conductive cable 20 can be selectively rapidly connected with the four-phase power connective head 12 of the socket body 10 via the four-phase power plug 21 thereof. In addition, the four-phase power plug 21 has a selectively coverable end cover 210 in order to provide dustproof, waterproof protective covering function thereon in case of being not in use, and in order for enhancing power using safety. The other end of the conductive cable 20 is electrically connectable with a four-phase power source. The other end of the conductive cable 20 can be another four-phase power plug 21 with selective connectivity function, or can be directly serially connected with an external four-phase power source.

Figure 4:
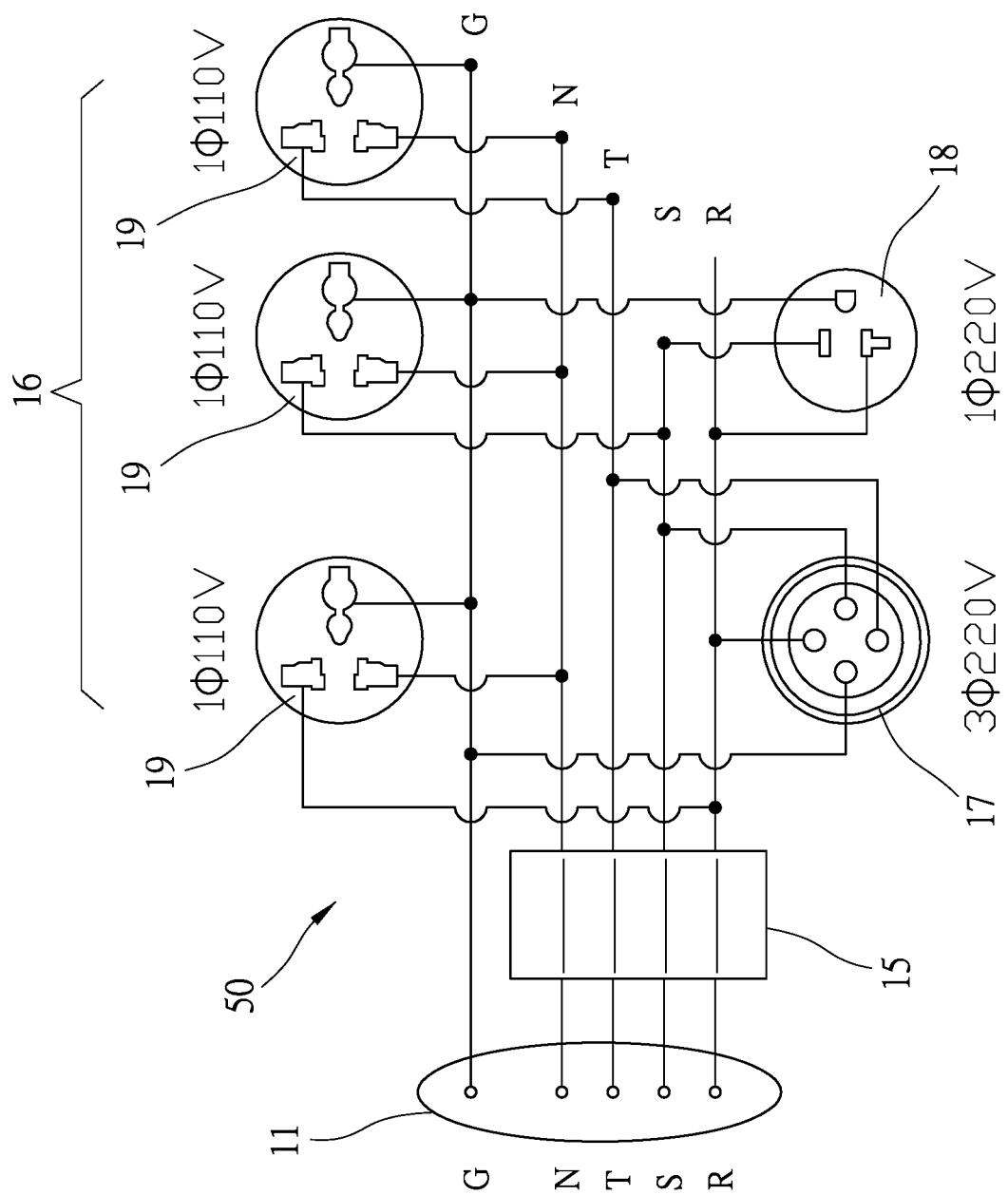
FIG. 4 shows a schematic circuit layout diagram of the extension cord for polyphase voltage conversion of FIG. 1 in accordance with a preferred embodiment of the present invention for illustration of patterns and relative relationships between respective parts.

In addition, the polyphase circuit 50 includes three phase conductors R, S, T respectively electrically connected with the four-phase power connective head 12, a neutral conductor N and a ground conductor G These conductors are used to electrically connect with the four-phase power connective head 12, the breaker 15 and the respective at least two power sockets 16. As shown in FIG. 4, in the best preferred embodiment for electrical connection of the polyphase circuit 50 in accordance with the present invention, the phase conductors R, S, T and the neutral conductor N are electrically connected with the breaker 15. The power socket 17 with a three-phase voltage of 220 V is electrically connected with the phase conductors R, S, T. The power socket 18 with a single-phase voltage of 220 V is electrically connected with either two of the phase conductors R, S, T (Such as the voltage conductors R, S) and the ground conductor G The three power sockets 19 with a single-phase voltage of 110 V are not only respectively electrically connected with both of the ground conductor G and the neutral conductor N, but also are respectively electrically connected with a selective one of the phase conductors R, S, T. As a result, output electrical currents of output voltages of respective phases can be balanced or uniformly distributed, and power using safety is therefore ensured.

By doing so, power sources with different phases and different voltages can be easily provided, and an extension cord for polyphase voltage conversion having a simple structure and high safety can be constituted.

In operation through the above structural design in accordance with the present invention, as shown in FIGS. 1 and 4 in actual use, users are only required to serially connect the extension cord in accordance with the present invention with a four-phase power source via the conductive cable 20 of the extension cord, and to properly arranged the conductive cable 20 based on actual need for ensuring environmental safety of a working area. Besides, the four-phase power plug 21 of the conductive cable 20 is required to be effectively connected with the four-phase power connective head 12 of the socket body 10 to form electrical connection. As a result, the power socket 17 with a three-phase voltage of 220 V, the power socket 18 with a single-phase voltage of 220 V and the power sockets 19 with a single-phase voltage of 110 V of the socket body 10 can respectively output power sources with different phases and different voltages via electrical conduction of the polyphase circuit 50 in the socket body 10 for connective use of corresponding electrical equipment. In the meantime, users can further utilize the word patterns and colors on the top covers 150, 170, 180, 190 of the power socket 17 with a three-phase voltage of 220 V, the power socket 18 with a single-phase voltage of 220 V and the power sockets 19 with a single-phase voltage of 110 V to recognize their representative phases and voltages in order to avoid connective errors on the electrical equipment and to further enhance power using safety.

Figure 6:
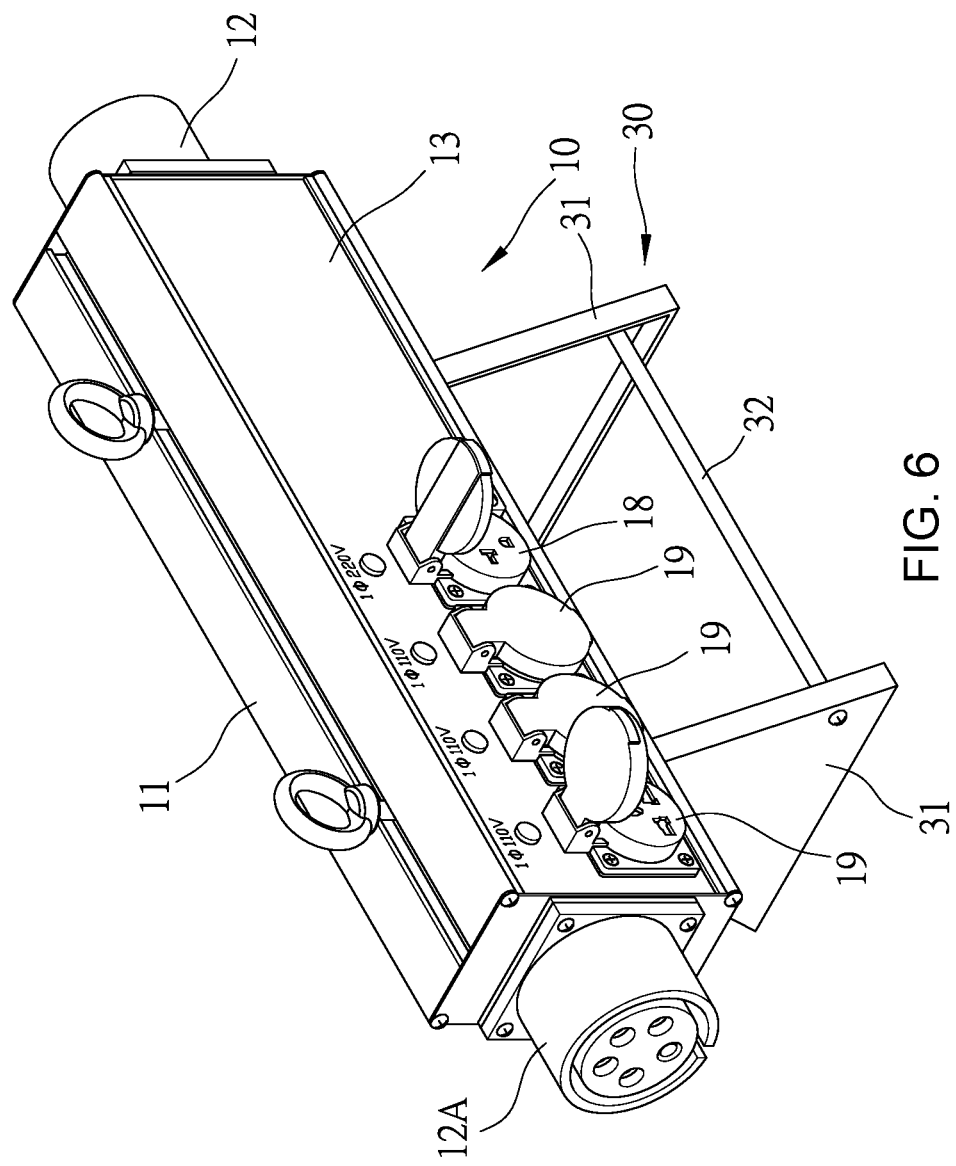
FIG. 6 shows a schematic appearance perspective view of an extension cord for polyphase voltage conversion in accordance with further another preferred embodiment of the present invention.
Figure 7:
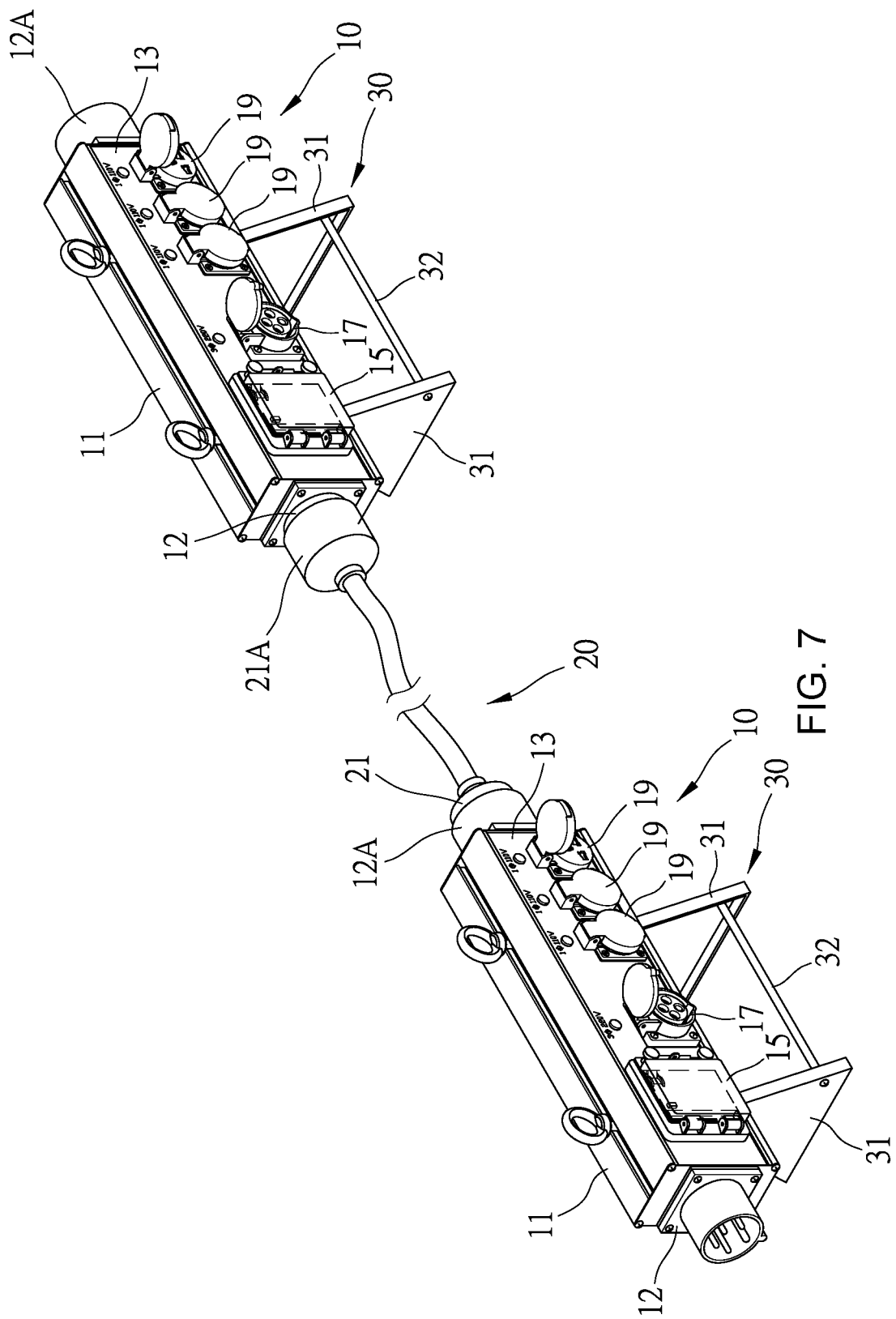
FIG. 7 shows a schematic appearance perspective view of an extension cord for polyphase voltage conversion in actual use in accordance with another preferred embodiment of the present invention.

Furthermore, as shown in FIGS. 5-7, an extension cord in accordance with a further preferred embodiment of the present invention is introduced. Two four-phase power connective heads 12, 12A are respectively disposed at two ends of the housing 11 of the socket body 10. The four-phase power connective heads 12, 12A can be a male-female mating structure for electrical serial connection via a conductive cable 20. Four-phase power plugs 21, 21A corresponding to the male and female four-phase power connective heads 12, 12A of the socket body 10 are respectively disposed at two ends of the conductive cable 20 in order to increase a using distance of the extension cord. Besides, the three phase conductors R, S, T, the neutral conductor N and the ground conductor G of the polyphase circuit 50 in the socket body 10 are used for conductor arrangement so that a work piece interface 13 can be disposed at each of two opposite lateral sides of the socket body 10. Each of the work piece interfaces 13 can have a breaker 15 having safety switch function and at least two power sockets 16 providing voltages with different phases disposed thereon. The at least two power sockets 16 include a combination including either two or more than two of at least one power socket 17 with a three-phase voltage of 220 V, at least one power socket 18 with a single-phase voltage of 220 V, and at least one power socket 19 with a single-phase voltage of 110 V. In a main preferred embodiment of the present invention, the at least two power sockets 16 disposed at a work piece interface 13 at a side of the socket body 10 have a power socket 17 with a three-phase voltage of 220 V and three power sockets 19 with a single-phase voltage of 110 V. The at least two power sockets 16 disposed at the other work piece interface 13 at the opposite side of the socket body 10 have a power socket 18 with a single-phase voltage of 220 V and three power sockets 19 with a single-phase voltage of 110 V. Hence, power connection need of users for more electrical equipment can be satisfied.

Additionally, according to certain embodiments in accordance with the present invention, a support frame 30 is disposed at a bottom face of the housing 11 of the socket body 10 other than faces of the housing 11 having the work piece interfaces 13 so that the socket body 10 can be straightly disposed on the ground to enhance using safety and convenience. Besides, the support frame 30 includes two angle plates 31 relatively disposed at two ends of the bottom face of the housing 11, and at least one support rod 32 disposed between bottom edges of the two angle plates 31 for constitution of the support frame 30. As a result, the socket body 10 can be firmly disposed on the ground through the support frame 30, and have advantages of convenient moving and arrangement.

It can be understood through the above structure and operation explanation that the extension cord for polyphase voltage conversion in accordance with the present invention is designed to utilize a conversion design of the polyphase circuit 50 disposed in the socket body 10. Accordingly, a four-phase power source can constitute a plurality of power sockets 16 with different phases and different voltages through a single breaker 15, such as a power socket 17 with a three-phase voltage of 220 V, a power socket 18 with a single-phase voltage of 220 V and a power socket 19 with a single-phase voltage of 110 V, for choice of users based on actual need. As a result, only arrangement of a single extension cord is required to provide choice of power sources with multiple phases and voltages. Not only a number of temporarily arranged cables in a working site can be simplified in order to enhance convenience and safety of operation in a working environment, but also entire safety of power using is enhanced and practicality of the extension cord is greatly promoted.

Accordingly, it can be understood that the present invention is an extremely creative invention. In addition to effectively solving problems faced by the ordinarily skilled in the art, the present invention is also configured to greatly improve efficacy. Besides, no identical or similar product in the same technical field can be found to be invented or in public use, and to have the same enhanced advantages. Therefore, the present invention meets requirements of "novelty" and "non-obviousness" as stipulated for utility patent applications in the patent law, and a patent application for the present invention is filed in accordance with the patent law.

| Component List | |
|---|---|
| Socket Body 10 | Housing 11 |
| Four-Phase Power Connective Head 12 | Work Piece Interfaces 13 |
| Breaker 15 | Top Cover 150 |
| Power Socket 16 | Three-Phase 220 V Power Socket 17 |
| Top Cover 170 | Single-Phase 220 V Power Socket 18 |
| Top Cover 180 | Single-Phase 110 V Power Socket 19 |
| Top Cover 190 | Conductive Cable 20 |
| Four-Phase Power Plug 21 | End Cover 210 |
| Polyphase Circuit 50 | Phase Conductor R, S, T |
| Neutral Conductor N | Ground Conductor G |

What is claimed is:

1. An extension cord for polyphase voltage conversion, comprising:
    a socket body comprising a hollow housing, and a four-phase power connective head disposed at an end of the housing in order to supply power to the extension cord, the housing further comprising a breaker having safety switch function and at least two power sockets providing voltages with different phases disposed therein;
    a conductive cable comprising an end thereof electrically connectable with a four-phase power source, and the other end thereof comprising a four-phase power plug correspondingly electrically connectable with the four-phase power connective head of the socket body;
    a polyphase circuit disposed in the socket body, and comprising three phase conductors respectively electrically connected with the four-phase power connective head, a neutral conductor and a ground conductor, the conductors used to electrically connect with the four-phase power connective head, the breaker and the respective at least two power sockets;
    wherein the at least two power sockets are configured to provide power sources with different phases and different voltages;
    the at least two power sockets of the socket body comprise a combination comprising either two or more than two of at least one power socket with a three-phase voltage of 220 V, at least one power socket with a single-phase voltage of 220 V, and at least one power socket with a single-phase voltage of 110 V.

2. The extension cord for polyphase voltage conversion as claimed in claim 1, wherein the four-phase power plug of the conductive cable has a selectively coverable end cover in order to provide dustproof, waterproof protective function.

3. The extension cord for polyphase voltage conversion as claimed in claim 1, wherein the at least two power sockets of the socket body comprise a power socket with a three-phase voltage of 220 V, a power socket with a single-phase voltage of 220 V, and three power sockets with a single-phase voltage of 110 V, the phase conductors and the neutral conductor of the polyphase circuit are electrically connected with the breaker, the power socket with a three-phase voltage of 220 V is electrically connected with the phase conductors, the power socket with a single-phase voltage of 220 V is electrically connected with either two of the phase conductors and the ground conductor, the three power sockets with a single-phase voltage of 110 V are not only respectively electrically connected with both of the ground conductor and the neutral conductor, but also are respectively electrically connected with a selective one of the phase conductors.

4. The extension cord for polyphase voltage conversion as claimed in claim 1, wherein the housing of the socket body has two opposite work piece interfaces, a work piece interface at a side of the housing has a breaker, a power socket with a three-phase voltage of 220 V and three power sockets with a single-phase voltage of 110 V via cooperative arrangement of the polyphase circuit, the other opposite work piece interface at an opposite side of the housing has a power socket with a single-phase voltage of 220 V and three power sockets with a single-phase voltage of 110 V.

5. The extension cord for polyphase voltage conversion as claimed in claim 1, wherein a support frame is disposed at a bottom face of the housing of the socket body other than faces of the housing having the at least two power sockets for the socket body being straightly disposed on the ground.

6. The extension cord for polyphase voltage conversion as claimed in claim 1, wherein each of the breaker and the respective at least two power sockets of the socket body has a selectively coverable top cover for dustproof, waterproof protective function.

7. The extension cord for polyphase voltage conversion as claimed in claim 6, wherein the top covers of the respective at least two power sockets of the socket body have different colors for recognition of users to a corresponding phase and voltage of each of the at least two power sockets.

8. The extension cord for polyphase voltage conversion as claimed in claim 1, wherein a four-phase power connective head is disposed at each of two ends of the housing of the socket body, the two four-phase power connective heads are a male-female mating structure for electrical serial connection via a corresponding conductive cable, four-phase power plugs corresponding to the male and female four-phase power connective heads of the socket body are respectively disposed at two ends of the corresponding conductive cable in order to increase a using distance of the extension cord.

9. The extension cord for polyphase voltage conversion as claimed in claim 8, wherein a support frame is disposed at a bottom face of the housing of the socket body other than faces of the housing having the at least two power sockets for the socket body being straightly disposed on the ground.

10. The extension cord for polyphase voltage conversion as claimed in claim 1, wherein four-phase power plug corresponding to the four-phase power connective head of the socket body for selective rapid connection between the conductive cable and the socket body.

11. The extension cord for polyphase voltage conversion as claimed in claim 10, wherein a support frame is disposed at a bottom face of the housing of the socket body other than faces of the housing having the at least two power sockets for the socket body being straightly disposed on the ground.

12. An extension cord for polyphase voltage conversion, comprising:
   a socket body comprising a hollow housing, and a four-phase power connective head disposed at an end of the housing in order to supply power to the extension cord, the housing further comprising a breaker having safety switch function and at least two power sockets providing voltages with different phases disposed therein;
   a conductive cable comprising an end thereof electrically connectable with a four-phase power source, and the other end thereof comprising a four-phase power plug correspondingly electrically connectable with the four-phase power connective head of the socket body; a polyphase circuit disposed in the socket body, and comprising three phase conductors respectively electrically connected with the four-phase power connective head, a neutral conductor and a ground conductor, the conductors used to electrically connect with the four-phase power connective head, the breaker and the respective at least two power sockets;
   wherein the at least two power sockets are configured to provide power sources with different phases and different voltages;
   a four-phase power connective head is disposed at each of two ends of the housing of the socket body, the two four-phase power connective heads are a male-female mating structure for electrical serial connection via a corresponding conductive cable, four-phase power plugs corresponding to the male and female four-phase power connective heads of the socket body are respectively disposed at two ends of the corresponding conductive cable in order to increase a using distance of the extension cord.

13. An extension cord for polyphase voltage conversion, comprising:
   a socket body comprising a hollow housing, and a four-phase power connective head disposed at an end of the housing in order to supply power to the extension cord, the housing further comprising a breaker having safety switch function and at least two power sockets providing voltages with different phases disposed therein;
   a conductive cable comprising an end thereof electrically connectable with a four-phase power source, and the other end thereof comprising a four-phase power plug correspondingly electrically connectable with the four-phase power connective head of the socket body;
   a polyphase circuit disposed in the socket body, and comprising three phase conductors respectively electrically connected with the four-phase power connective head, a neutral conductor and a ground conductor, the conductors used to electrically connect with the four-phase power connective head, the breaker and the respective at least two power sockets;
   wherein the at least two power sockets are configured to provide power sources with different phases and different voltages;
   the at least two power sockets of the socket body comprise a power socket with a three-phase voltage of 220 V, a power socket with a single-phase voltage of 220 V, and three power sockets with a single-phase voltage of 110 V, the phase conductors and the neutral conductor of the polyphase circuit are electrically connected with the breaker, the power socket with a three-phase voltage of 220 V is electrically connected with the phase conductors, the power socket with a single-phase voltage of 220 V is electrically connected with either two of the phase conductors and the ground conductor, the three power sockets with a single-phase voltage of 110 V are not only respectively electrically connected with both of the ground conductor and the neutral conductor, but also are respectively electrically connected with a selective one of the phase conductors.

\* \* \* \* \*